(No Model.)
A. HEBERT & T. P. BUTLER.
NUT LOCK.
No. 299,472. Patented May 27, 1884.
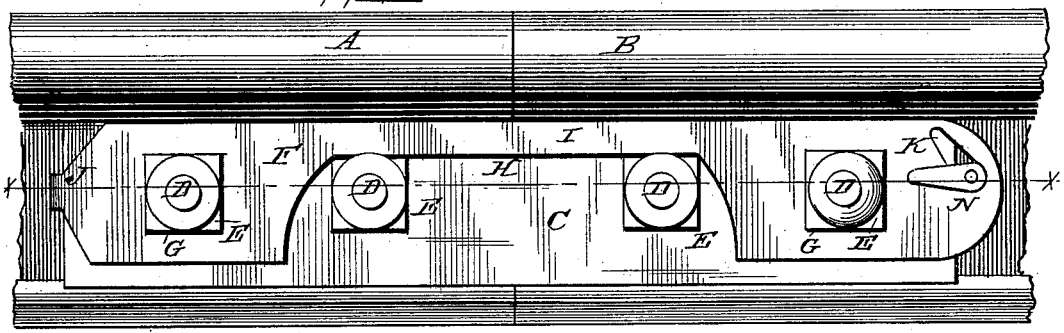
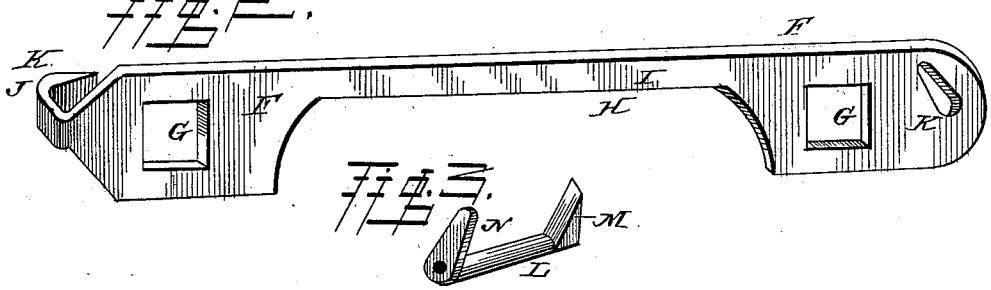
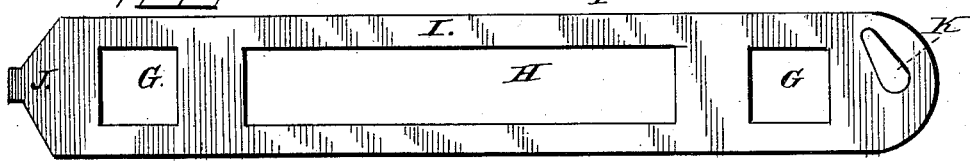
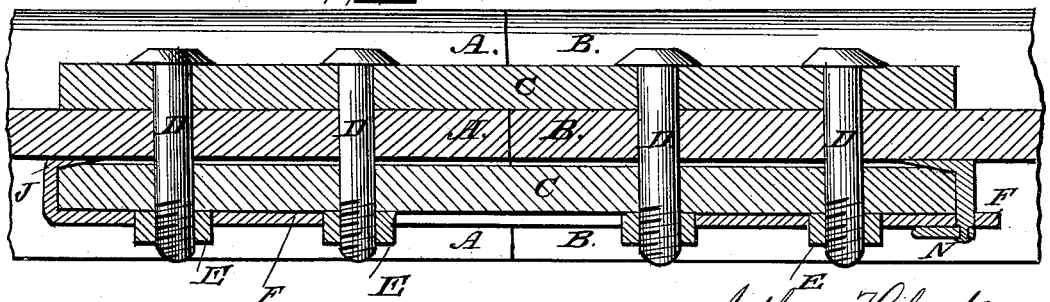
Arthur Hebert
Thomas P. Butler,
INVENTORS,
WITNESSES:
Fred G. Dieterich,
Arthur L. Morsell.
By Louis Bagger & Co.
ATTORNEYS.

UNITED STATES PATENT OFFICE.

ARTHUR HEBERT, OF MONTEBELLO, AND THOMAS PAGE BUTLER, OF MONTREAL, QUEBEC, CANADA.

NUT-LOCK.

SPECIFICATION forming part of Letters Patent No. 299,472, dated May 27, 1884.

Application filed January 15, 1884. (No model.)

*To all whom it may concern:*

Be it known that we, ARTHUR HEBERT, of Montebello, Canada, and THOMAS P. BUTLER, of Montreal, Canada, subjects of the Queen of Great Britain, residing in the Province of Quebec and Dominion of Canada, have invented certain new and useful Improvements in Nut-Locks for Rail-Joints; and we do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of a rail-joint provided with our improved nut-lock. Fig. 2 is a perspective view of the lock-plate removed. Fig. 3 is a perspective view of the removable key used in conjunction with the lock-plate. Fig. 4 represents a lock-plate of a somewhat modified construction, and Fig. 5 is a horizontal sectional view through line *x x* in Fig. 1.

Similar letters of reference indicate corresponding parts in all the figures.

Our invention has relation to devices for locking the nuts upon the bolts which connect the fish-plates of railway-joints, although our device is applicable also for the locking of nuts upon bolts used for other purposes where two or more bolts are used arranged parallel to one another; and our improvement consists in the detailed construction and combination of parts of the locking-plate and its fastenings, which will be hereinafter more fully described.

In the accompanying drawings, A and B denote the two ends of a rail-joint, and C C the fish-plates, which may be of any desirable construction. The bolts are shown at D and the nuts at E. The lock-plate consists of a flat bar or plate, F, of iron or other suitable metal, having openings G G at opposite ends, adapted to fit over the nuts and cut away to form a recess, H, between the ends. The narrow part or web I of the plate above this recess is of such a width that it will fit between the squared nuts and the overhanging part or tread of the rail, as will appear more clearly by reference to Fig. 1 of the drawings.

Instead of recessing the plate in the manner above described, and shown in Figs. 1 and 2, this may be made with a central rectangular slot, as shown in Fig. 4, whereby the bottom of the plate is left intact, said slot being of such a width that it will fit over the nuts when the lock-plate is placed in its appropriate position.

The lock-plate is provided at one end with a hook, J, and at the opposite end with a key-hole, K. In placing the lock-plate upon the fish-plate this hook J is inserted between the web of the rail and the fish-plate, as shown in Fig. 5, and the other end of the lock-plate is fixed in position by means of the key shown in Fig. 3, which consists of a stud or shank, L, bent at right angles, to form a wedge-shaped lip, M, and provided with a pivoted button, N, adapted to fit the key-hole K. The lip M is wedged between the web of the rail and the fish-plate, and the button N turned in such position that it may be slipped through the key-hole K, after which it is turned to one side, as shown in Fig. 1, thereby holding that end of the lock-plate firmly upon the corresponding end of the fish-plate. To remove the lock-plate, if it is desired to remove the nuts for the purpose of withdrawing the bolts, all that is necessary is to turn the key-button into the position for slipping it out of the key-hole, when the lock-plate may readily be released by a blow of a hammer or mallet, so as to knock its hooked end out from between the rail and the fish-plate.

Having thus described our invention, we claim and desire to secure by Letters Patent of the United States—

1. The combination, in a railway-joint, of the fish-plates, the bolts, the nuts, a flat bar slotted or recessed to fit upon the nuts, and provided with a hook at one end and a key-hole at the other end, and a removable key adapted to be wedged between the web of the rail and one end of the fish-plate, and having a turn-button adapted to fit the key-hole in the lock-plate, substantially as set forth.

2. The combination, with the fish-plates and nuts of a railway-joint, of the lock-plate F, constructed as described, and the removable key L M N, adapted to interlock with the key-hole in the plate, substantially as set forth.

3. The key consisting of the stud L, wedge-shaped lip M at right angles to the stud, and turn-button N, substantially as described.

In testimony that we claim the foregoing as our own we have hereunto affixed our signatures in presence of two witnesses.

ARTHUR HEBERT.

Witnesses:
 WALTER H. BROWN,
 J. P. LA BELLE.

THOMAS PAGE BUTLER.

Witnesses:
 C. H. STEPHENS,
 CHAS. MILLINGTON.